R. BROWN.
GRAIN CLEANER FOR HARVESTERS.
APPLICATION FILED MAR. 11, 1912.
1,064,440.
Patented June 10, 1913.
4 SHEETS—SHEET 1.
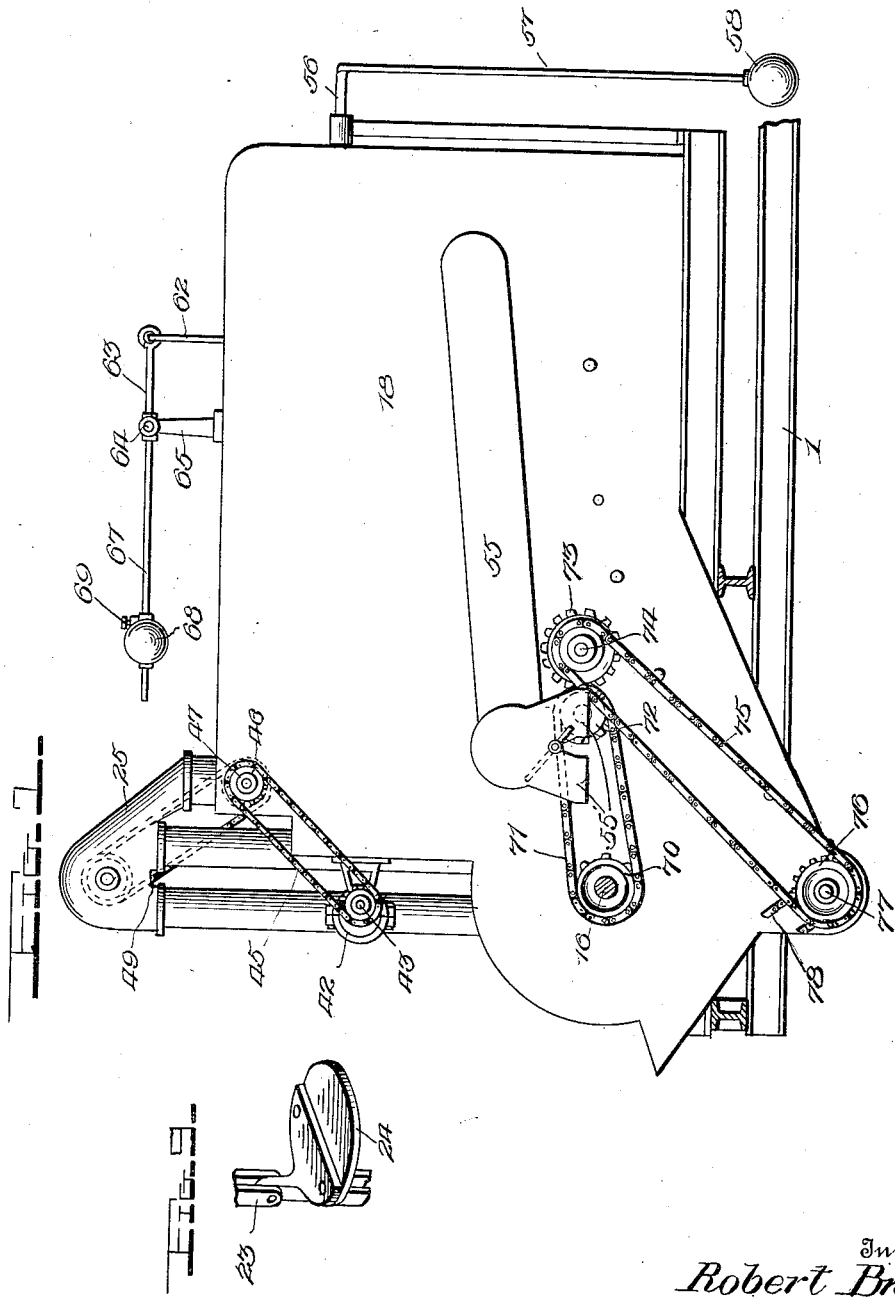
Witnesses
Chas. L. Griesbauer.
A. B. Norton.
Inventor
Robert Brown,
By Watson E. Coleman,
Attorney R. BROWN.
GRAIN CLEANER FOR HARVESTERS.
APPLICATION FILED MAR. 11, 1912.
1,064,440.
Patented June 10, 1913.
4 SHEETS—SHEET 2.
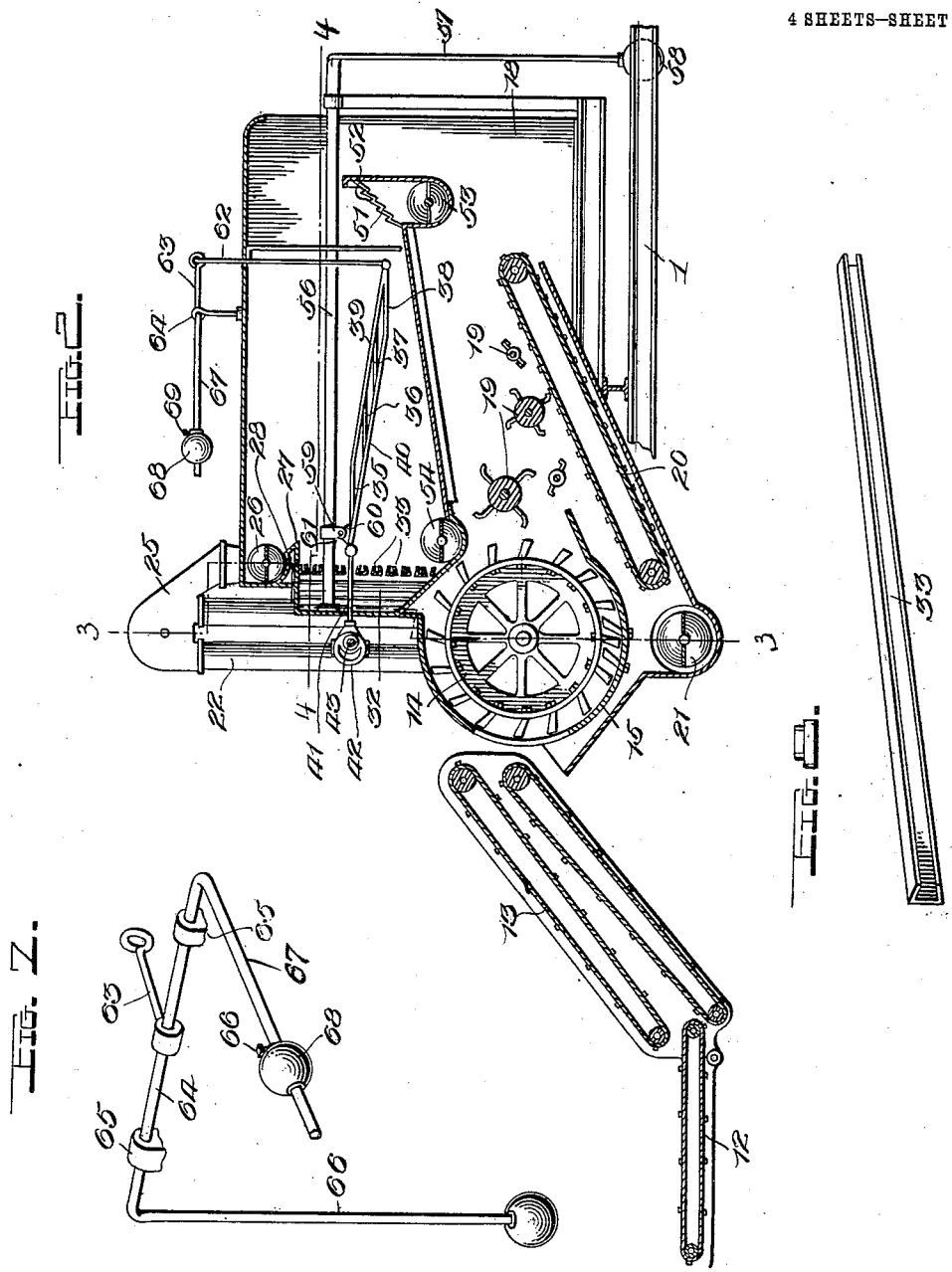
Inventor
Robert Brown.
Witnesses
Chas. L. Griesbaur.
A. B. Norton
By Watson E. Coleman,
Attorney R. BROWN.
GRAIN CLEANER FOR HARVESTERS.
APPLICATION FILED MAR. 11, 1912.
1,064,440.
Patented June 10, 1913.
4 SHEETS—SHEET 3.
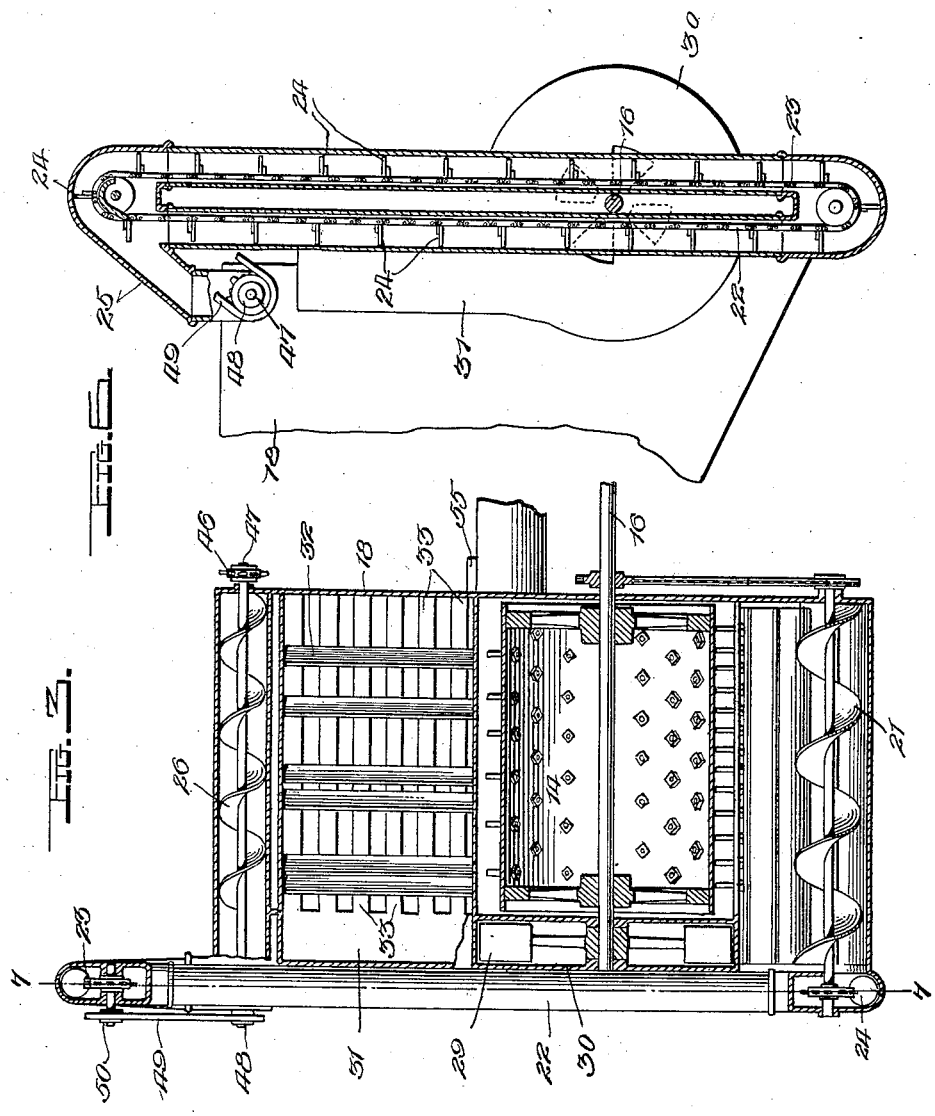
Witnesses
Chas. L. Griesbauer.
A. B. Norton.
Inventor
Robert Brown,
By Watson E. Coleman
Attorney

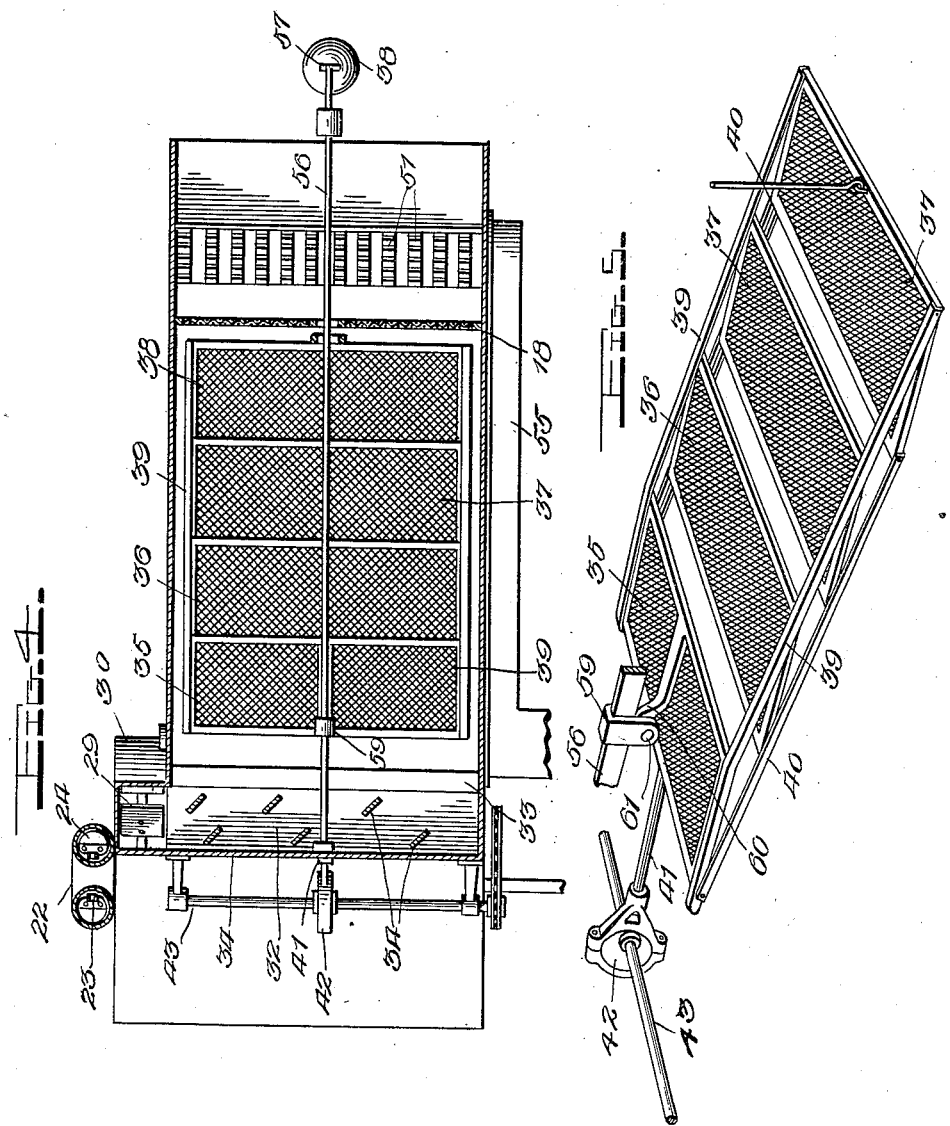

UNITED STATES PATENT OFFICE.

ROBERT BROWN, OF DAYTON, WASHINGTON.

GRAIN-CLEANER FOR HARVESTERS.

1,064,440. Specification of Letters Patent. Patented June 10, 1913.

Application filed March 11, 1912. Serial No. 683,165.

*To all whom it may concern:*

Be it known that I, ROBERT BROWN, a citizen of the United States, residing at Dayton, in the county of Columbia and State of Washington, have invented certain new and useful Improvements in Grain-Cleaners for Harvesters, of which the following is a specification, reference being had to the accompanying drawings.

This invention has for its primary object an improved grain cleaner for harvesters, the parts of which are so constructed and arranged that the screens will by gravity automatically adjust themselves to the slope or inequalities of the ground over which the harvester is passing, whereby the screens will be at all times maintained level and be capable of performing their required functions. And the invention further aims to generally improve machines of this character and to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings in which, Figure 1 is a view in side elevation of the casing of my improved harvester. Fig. 2 is a longitudinal sectional view through the threshing and cleaning mechanisms. Fig. 3 is a transverse sectional view on the line 3—3, of Fig. 2. Fig. 4 is a horizontal section on the line 4—4, of Fig. 2. Fig. 5 is a detail perspective view of the sieve or screens. Fig. 6 is a vertical sectional view on the line 7—7, of Fig. 3. Fig. 7 is a detail perspective view of one of the automatic sieve leveling devices. Fig. 8 is a detail perspective view of one of the bars that define one wall of the blower chamber, and, Fig. 9 is a detail perspective view of a portion of the elevator chain.

Corresponding and like parts are referred to in the following description and designated in the accompanying drawings by like reference characters.

In describing the specific embodiment of the present invention I have shown a main frame work 1 preferably made of standard I-beams or other suitable metal structure which is adapted to be propelled over the fields upon a suitable harvester truck not shown. As the device is propelled over the fields the harvester will first cut the grain which then falls from the sickle in the usual manner upon a movable draper thence it is deposited upon the header and subsequently carried upon a rearwardly traveling conveyer 12, from whence, it passes to and between the rearwardly and upwardly inclined upper and lower drapers or endless aprons 13. From the rearwardly and upwardly inclined conveyers or aprons 13, the headed grain passes to the cylinder 14 which co-acts with the concave 15, said cylinder, in the present embodiment of the invention, being mounted on a transversely extending shaft 16 which is a continuation of the drive or crank shaft of motor or other prime mover. After the grain has been acted upon by the cylinder 14, the straw will pass rearwardly out of the casing 18, being driven rearwardly by the revoluble beaters 19 which may be of any desired construction and arrangement, the grain itself passing down a rattle rack 20 and falling into the transversely extending auger or screw conveyer 21.

The discharge end of the auger or screw conveyer 21 terminates in an elevator 22 which embodies upwardly extending parallel cylindrical members in which an endless elevator chain 23 is mounted, said chain having its links provided with plates or blades 24, whereby the grain will be carried upwardly and discharged into a rearwardly and downwardly inclined chute 25 from which it will pass into an auger or screw conveyer 26 extending transversely across the casing 18 at the top and forward end of the latter. The auger 26 overhangs a transversely extending segmental trough 27 which terminates substantially on a line directly underneath the center of rotation of the auger in a downwardly and rearwardly sloping flange 28. Thus, the grain will be caused in the rotation of the auger 26, to fall down the sloping wall 28 where they will meet rearwardly flowing currents of air.

The fan 29 which is of the centrifugal type, is driven by the shaft 16, before mentioned, and the casing 30 of the fan opens into an upwardly extending flue 31 which at its upper end opens laterally into a transversely elongated air chamber 32. The rear wall of the chamber 32 which separates it from the rear upper portion of the casing 18, is defined by a plurality of transversely extending preferably metal bars 33 which are arranged in superimposed and slightly spaced relation to each other, and to direct the air properly in through the bars, whereby it will be distributed evenly throughout the entire lateral extent of the spaces between said bars, I provide in the chamber 32, a plurality of differently positioned deflecting plates 34. It is to be particularly noted that these laterally elongated air spaces between the bars 33 commence at the top directly contiguous to the discharge edge of the rearwardly sloping wall 28, whereby the beards and chaff will not be permitted to fall downwardly in the casing upon the screens and subjacent parts, but will be blown directly out through the rear end of the casing 18, while the grain itself will be deposited upon the screens of which, in the present embodiment of the invention, there are four, designated 35, 36, 37 and 38, respectively, the screens being arranged in stepped relation to each other descending in a rearward direction. The rear edge of each screen preferably just overlaps or lies flush with the forward edge of the adjacent screen in the series, the screens being held in upper and lower preferably metallic rectangular frames, designated 39 and 40, respectively.

In order to impart a vibratory movement to the screens or sieve which is formed thereby, such movement being in a direction longitudinally of the casing 18, a rod 41 is pivotally connected at one end to the forward edge of the sieve and is connected at its other end to an eccentric disk 42 which is mounted upon a transversely extending shaft 43. A sprocket wheel 44 is secured to the shaft 43 and a chain 45 extends around said sprocket wheel and around a corresponding wheel 46 on the shaft 47 of the auger 26. The shaft 47 also carries a sprocket wheel 48, around which a chain 49 passes and the chain 49 passes around a sprocket wheel 50 which is secured to the upper shaft of the chain elevator 23. The elevator 23 is operated from the auger or screw conveyer 21 by sprocket gearing, as shown, and said auger receives its motion from the shaft 16 by sprocket connection therewith. As the grain falls upon the horizontally disposed and vertically spaced screens 35, 36, 37 and 38, it will manifestly be met by the currents or strata of air currents issuing from the spaces between the bars 33 and will thereby be effectually cleaned, any chaff or beards which might possibly happen to drop upon any of the screens being discharged upon a laterally extending series of upwardly and rearwardly inclined bars 51 which are arranged in laterally spaced relation to each other at the rear end of the casing 18, the foremost and upper edges of said bars being formed with upwardly and rearwardly facing shoulders 52, whereby the grain will have an opportunity to drop into a return auger 53, while the chaff and beards will be blown rearwardly from the machine. The return auger 53 is connected to the main discharge auger 54 by a return flue or chute 55. As clearly illustrated in the drawings, the bottom wall of the cleaning chamber is inclined downwardly and forwardly from the bars 51 to the discharge auger or conveyer 54. The discharge auger extends transversely, as shown, and is provided at its discharge end with downwardly facing discharge mouths 55' which are preferably controlled by a single cutoff or damper, whereby the operation of filling the sacks may be practically a continuous one, one of the discharge mouths being shut off while one sack is being tied and the other sack filled.

As stated at the outset of the specification, it is one of the primary objects of my invention to provide means for maintaining the sieve or screen at all times level, both laterally and longitudinally considered, no matter whether the harvester be traveling up or down hill or on either side of a slope. In order to accomplish this result, I have provided the following instrumentalities:

As best illustrated in Fig. 4, a longitudinal bar 56 extends above the median line of the screen, from the front to the rear thereof, said bar being mounted to turn about its longitudinal axis and being formed with a downwardly extending rear end 57 which constitutes a laterally swinging pendulum and which is provided at its lower extremity with a pendant weight 58. An inverted U-shaped strap 59 is inserted over the longitudinally extending portion of the bar 56 at the forward edge of the sieve and the latter is provided at such edge with an upwardly projecting ear 60 which is pivotally connected to said strap, as at 61. It will be noted that the bar 56 is flat and that the strap 59 is rectangular with parallel side walls embracing the bar. Consequently, when the machine tilts to one side or the other, the pendulum will swing correspondingly and the entire shaking sieve will be rocked laterally so that it will at all times be maintained level.

In order to maintain the sieve in a true horizontal position longitudinally considered, irrespective of the particular forward or downward inclination of the machine as, for instance, when it is going up or down hill, the rear edge of the sieve is pivotally connected to a hanger rod 62, the upper end of said rod being connected to a crank 63 which projects perpendicularly from a transversely extending shaft 64 journaled at its ends in standards 65 that are secured to the top of the casing 18. A pendulum 66 is secured to one end of the shaft 64, and a counter-balancing arm 67 is connected to the other end of said shaft and preferably extends at right angles to the pendulum 66, the counter-balancing arm 67 carrying a preferably adjustable weight 68 held in adjusted positions thereon by a set screw 69 or equivalent fastening devices.

From the foregoing description in connection with the accompanying drawings, the operation of my improved combined harvester so far as the threshing and cleaning mechanism are concerned, will be apparent, as the operations of the different parts have been described coincident with the details of construction and relative arrangement of the parts. For a general statement of the operation, however, it may be stated that as the machine is drawn over the fields, the grain will be cut by the sickle and carried by the draper to the conveyer 12, from whence, it will pass by means of the rearwardly and upwardly inclined conveyers 13 into the concave 15 where it will be acted upon by the cylinder 14, the straw is passed rearwardly from the casing 18, while the grain itself will be carried by the auger 21 in a lateral direction and passed to the elevator 22, which will carry it upwardly and deposit it in the chute 25, from whence, it will fall into the auger 26. As the grain is forced off the rearwardly sloping wall 28 by the rotating auger 26, it will at once meet strong currents of air passing through the uppermost bars 33 and the beards and chaff will be immediately blown out of the machine and not permitted to fall upon the sieve. The grain will fall upon the successive screens through which strong currents of air are caused to pass from the chamber 32, and the grain will thus be entirely cleaned and the most of it will fall directly upon the forwardly sloping floor to the laterally extending discharge conveyer 54, while some of it will be treated by the bars 52 and will be conveyed from the auger 53 to the auger 54 and then finally discharged from the side of the machine in a thoroughly cleaned condition. Preferably, the shaft 16 carries a sprocket wheel 70, around which a chain 71 passes, said chain also passing around a sprocket wheel 72 which is mounted on the shaft of one of the beaters, as best illustrated in Fig. 1. The said shaft carries a gear wheel which meshes with a gear wheel 73 on a shaft 74, said shaft also being provided with a sprocket wheel around which a chain 75 passes. The chain 75 passes around a sprocket wheel 76 which is secured to the shaft 77 of the auger 21. Another sprocket chain designated 78 is operatively connected to the shaft 77 and is intended to drive the conveyers 13, as clearly indicated by a comparison of Figs. 1 and 2 of the drawings.

While the accompanying drawings illustrate what I believe to be the preferred embodiment of my invention, it is to be understood that the invention is not limited thereto, but that various changes may be made in the construction, arrangement and proportions of the parts without departing from the scope of the invention, as defined in the appended claims.

Having thus described the invention what is claimed is:—

1. In a machine of the character described, the combination of a frame-work, a casing supported thereby, a shaking sieve mounted in the casing, a bar extending longitudinally of the casing above the sieve and mounted to turn about its longitudinal axis, a laterally swinging pendulum connected to one end of the bar, a strap connected to the bar, and a pivotal connection between the strap and the sieve.

2. In a machine of the character described, the combination of a frame-work, a casing supported thereon, a shaking sieve mounted in the casing, a bar extending longitudinally of the casing and mounted to turn about its longitudinal axis, a laterally swinging pendulum connected to said bar, a pivotal connection between the forward edge of the sieve and the bar, a hanger rod connected to the rear edge of the sieve, and a longitudinally swinging pendulum connected to said hanger rod.

3. In a machine of the character described, the combination of a frame-work, a casing supported thereon, a shaking sieve mounted in the casing, a longitudinally extending bar mounted in the casing above the sieve and pivotally connected to the forward edge of the latter, a laterally swinging pendulum connected to said bar, a shaft extending transversely across the top of the casing, a hanger rod having a crank connection with the shaft and pivotally connected at its lower end to the rear edge of the sieve, and a longitudinally swinging pendulum connected to said shaft.

4. In a machine of the character described, the combination of a casing, a sieve mounted in said casing, a series of superimposed and spaced transversely extending bars mounted in the casing and separated from one wall thereof, means for forcing a blast of air laterally into the space between said bars and the said wall of the casing, and deflectors mounted in said space, for the purpose specified.

5. In a machine of the character described, the combination of a casing, a sieve mounted in the casing, means for establishing currents of air through the sieve, a series of upwardly and rearwardly inclined bars arranged in the casing at the rear end of the sieve and spaced laterally from each other, and a return auger underneath said bars, the upper edges of the bars being formed with upwardly and rearwardly facing shoulders.

6. In a machine of the character described, the combination of a frame work, of a casing mounted thereupon, a longitudinally extending bar mounted in the said casing, a sieve pivotally connected at its forward edge to the said bar, a laterally swinging pendulum connected to said bar, a vertically extending hanger rod pivotally connected to the opposite end of the said sieve, a shaft journaled upon said casing, a crank arm extending from said shaft and connected to said hanger rod, longitudinally swinging weight arms connected to the opposite ends of said shaft and the said weight arms being at right angles to one another substantially as described.

7. In a machine of the character described, the combination of a casing, a sieve mounted in said casing, a series of superimposed and spaced transversely extending bars mounted in said casing and separated from one wall thereof, a plurality of vertically extending deflector plates mounted in said casing between the said bars and the wall thereof, and means for forcing blasts of air laterally into the casing against said deflector plates for the purpose specified.

In testimony whereof I hereunto affix my signature in the presence of two witnesses.

ROBERT BROWN.

Witnesses:
W. E. CAHILL,
E. E. McKISSICK.

---

Copies of this patent may be obtained for five cents each, by addressing the "Commissioner of Patents, Washington, D. C."